US012754141B2

(12) United States Patent
Mizukoshi et al.

(10) Patent No.: US 12,754,141 B2
(45) Date of Patent: Oct. 6, 2026

(54) DETERIORATION ESTIMATION SYSTEM, DETERIORATION ESTIMATION METHOD, AND RECORDING MEDIUM

(71) Applicant: NEC Corporation, Tokyo (JP)

(72) Inventors: Yusuke Mizukoshi, Tokyo (JP); Chisato Sugawara, Tokyo (JP); Toshimichi Yokote, Tokyo (JP); Yosuke Kimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 224 days.

(21) Appl. No.: 18/724,681

(22) PCT Filed: Jan. 14, 2022

(86) PCT No.: PCT/JP2022/001143
§ 371 (c)(1),
(2) Date: Jun. 27, 2024

(87) PCT Pub. No.: WO2023/135749
PCT Pub. Date: Jul. 20, 2023

(65) Prior Publication Data
US 2025/0067681 A1 Feb. 27, 2025

(51) Int. Cl.
*G06V 20/56* (2022.01)
*G01N 21/88* (2006.01)
*G01N 21/956* (2006.01)

(52) U.S. Cl.
CPC ... *G01N 21/8851* (2013.01); *G01N 21/95607* (2013.01); *G01N 2021/8854* (2013.01); *G01N 2021/889* (2013.01)

(58) Field of Classification Search
CPC ......... G01N 21/8851; G01N 21/95607; G01N 2021/8854; G01N 2021/889; G08G 1/00;
(Continued)

(56) References Cited

U.S. PATENT DOCUMENTS

2013/0173208 A1* 7/2013 Kuzunishi ................ G01B 5/28 73/104
2018/0070058 A1* 3/2018 Yonekawa ....... G08G 1/096716
(Continued)

FOREIGN PATENT DOCUMENTS

CN 107798293 A * 3/2018 ............. G06V 20/13
JP 2013-140448 A 7/2013
(Continued)

OTHER PUBLICATIONS

International Search Report for PCT Application No. PCT/JP2022/001143, mailed on Mar. 8, 2022.
(Continued)

*Primary Examiner* — Jose L Couso

(57) ABSTRACT

A deterioration estimation system according to an aspect of the present disclosure includes: a memory configured to store instructions; and at least one processor configured to execute the instructions to: detect road surface deterioration from a first road surface image; determine, in the first road surface image, a first region where deterioration is detectable and a second region where deterioration is difficult to detect; calculate a degree of deterioration of the first region based on a detection result from the first road surface image; estimate a degree of deterioration of the second region based on a degree of deterioration in road surface deterioration detected from a second road surface image imaged before the first road surface image; and calculate a degree of deterioration of the road surface based on the calculated degree of deterioration of the first region and the estimated degree of deterioration of the second region.

17 Claims, 10 Drawing Sheets

(58) Field of Classification Search
CPC ........ G08G 1/09; G08G 1/0112; E01C 23/01; G01B 5/28; G06T 2207/10032; G06T 2207/20036; G06T 2207/30248; G06T 2207/30252; G06T 2207/30256; G06T 7/0002; G06T 7/0004; G06T 7/20; G06T 7/60; G06T 7/62; G06T 7/74; G06V 20/56; G06V 20/588; G01C 1/00; B60W 40/06; B60T 2210/14
See application file for complete search history.

(56) References Cited

U.S. PATENT DOCUMENTS

| | | | | |
|---|---|---|---|---|
| 2018/0195973 | A1* | 7/2018 | Yonekawa | G01B 11/30 |
| 2019/0279001 | A1* | 9/2019 | Yamazaki | G06V 20/56 |

FOREIGN PATENT DOCUMENTS

| | | | | | |
|---|---|---|---|---|---|
| JP | 2018-036076 | A | | 3/2018 | |
| JP | 2019-114495 | A | | 7/2019 | |
| JP | 2019-185443 | A | | 10/2019 | |
| JP | 2021-060656 | A | | 4/2021 | |
| JP | 6892197 | B1 | * | 6/2021 | G08G 1/0129 |
| JP | 2021-162868 | A | | 10/2021 | |
| JP | 6955295 | B1 | * | 10/2021 | G08G 1/00 |
| WO | 2021/193148 | A1 | | 9/2021 | |

OTHER PUBLICATIONS

English translation of Written opinion for PCT Application No. PCT/JP2022/001143, mailed on Mar. 8, 2022.

* cited by examiner

DETERIORATION ESTIMATION SYSTEM, DETERIORATION ESTIMATION METHOD, AND RECORDING MEDIUM

This application is a National Stage Entry of PCT/JP2022/001143 filed on Jan. 14, 2022, the contents of all of which are incorporated herein by reference, in their entirety.

TECHNICAL FIELD

The present disclosure relates to a deterioration estimation system and the like.

BACKGROUND ART

A road surface deteriorates over time. For appropriate management and repair of the road surface, the degree of deterioration of the road surface is measured. There are various methods for measuring the degree of deterioration. PTL 1 discloses, as an example, a method of analyzing an image captured by a camera and measuring a degree of deterioration.

A future degree of deterioration is predicted. PTL 2 discloses a road management system that analyzes a regression line approximating a change in road surface property with time in a measurement period. In PTL 2, a near-future regression line after the measurement period has elapsed is predicted based on the traffic volume and the weather condition.

CITATION LIST

Patent Literature

PTL 1: JP 2018-036076 A
PTL 2: JP 2019-185443 A

SUMMARY OF INVENTION

Technical Problem

Depending on conditions, road surface deterioration may not be accurately measured from the image. For example, when the road surface is covered with water or snow due to precipitation or snowfall, it is difficult to detect road surface deterioration.

An object of the present disclosure is to provide a deterioration estimation system and the like capable of estimating a degree of deterioration of a road surface even when there is a region where it is difficult to detect road surface deterioration in a road surface image obtained by imaging the road surface.

Solution to Problem

A deterioration estimation system according to the present disclosure includes a detection means for detecting road surface deterioration from a first road surface image obtained by imaging a road surface, a determination means for determining, in the first road surface image, a first region in which road surface deterioration is detectable and a second region in which it is difficult to detect road surface deterioration, a first calculation means for calculating a degree of deterioration of the first region based on a detection result from the first road surface image, an estimation means for estimating a degree of deterioration of the second region based on a degree of deterioration in road surface deterioration detected from a second road surface image obtained by imaging the road surface before the first road surface image, and a second calculation means for calculating a degree of deterioration of the road surface based on the calculated degree of deterioration of the first region and the estimated degree of deterioration of the second region.

A deterioration estimation method according to the present disclosure includes detecting road surface deterioration from a first road surface image obtained by imaging a road surface, determining, in the first road surface image, a first region in which road surface deterioration is detectable and a second region in which it is difficult to detect road surface deterioration, calculating a degree of deterioration of the first region based on a detection result from the first road surface image, estimating a degree of deterioration of the second region based on a degree of deterioration in road surface deterioration detected from a second road surface image obtained by imaging the road surface before the first road surface image, and calculating a degree of deterioration of the road surface based on the calculated degree of deterioration of the first region and the estimated degree of deterioration of the second region.

A program according to the present disclosure causes a computer to execute the steps of detecting road surface deterioration from a first road surface image obtained by imaging a road surface, determining, in the first road surface image, a first region in which road surface deterioration is detectable and a second region in which it is difficult to detect road surface deterioration, calculating a degree of deterioration of the first region based on a detection result from the first road surface image, estimating a degree of deterioration of the second region based on a degree of deterioration in road surface deterioration detected from a second road surface image obtained by imaging the road surface before the first road surface image, and calculating a degree of deterioration of the road surface based on the calculated degree of deterioration of the first region and the estimated degree of deterioration of the second region. The program may be stored in a non-transitory computer-readable recording medium.

Advantageous Effects of Invention

According to the present disclosure, even when there is a region where it is difficult to detect road surface deterioration in a road surface image obtained by imaging a road surface, it is possible to estimate the degree of deterioration of the road surface.

EXAMPLE EMBODIMENT

Hereinafter, example embodiments of a deterioration estimation system, a deterioration estimation method, a program, and a non-transitory recording medium recording the program according to the present disclosure will be described in detail with reference to the drawings. The present example embodiment does not limit the disclosed technology.

First Example Embodiment

Figure 1:
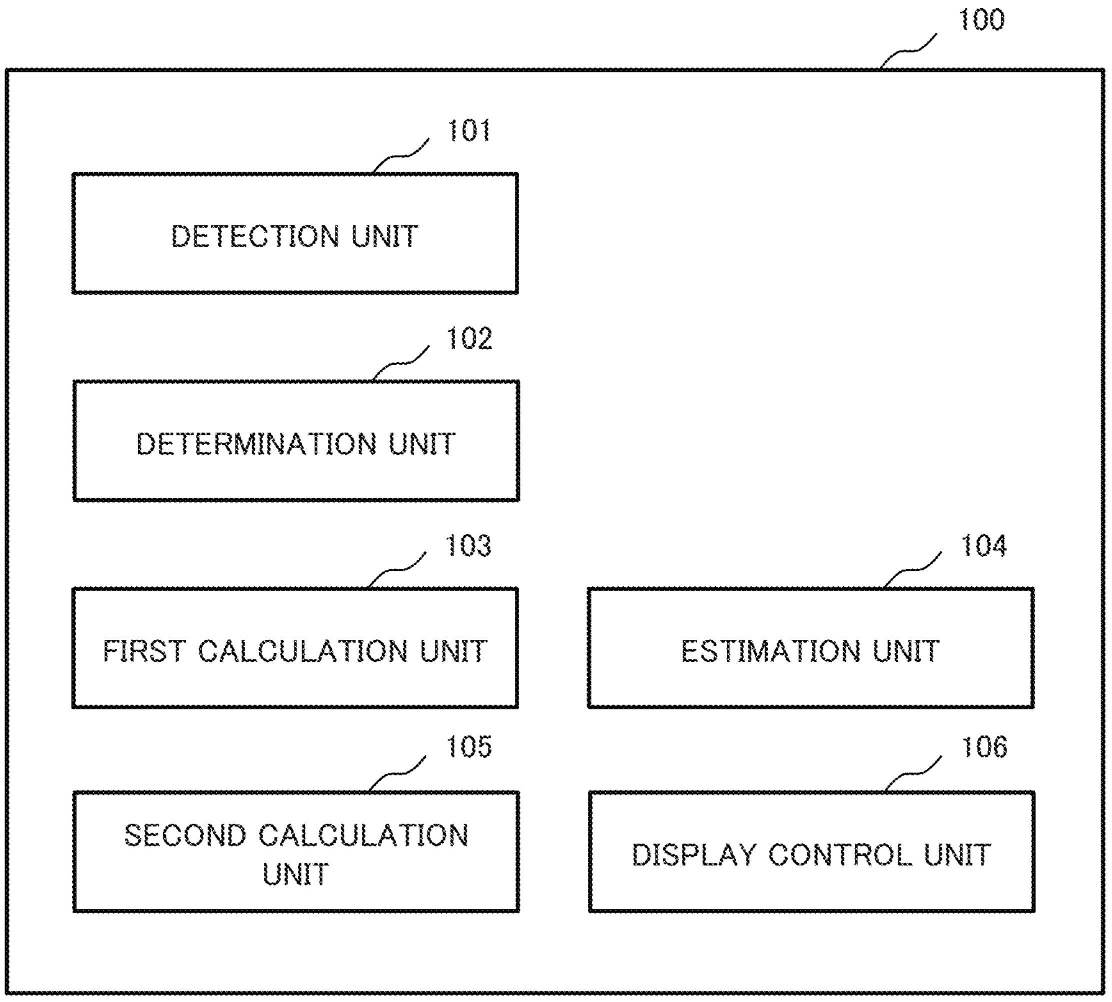
FIG. 1 is a block diagram illustrating a configuration example of a deterioration estimation system.

FIG. 1 is a block diagram illustrating a configuration example of a deterioration estimation system 100 according to the first example embodiment. A deterioration estimation system 100 according to the first example embodiment includes a detection unit 101, a determination unit 102, a first calculation unit 103, an estimation unit 104, and a second calculation unit 105. In the first example embodiment, FIG. 1 illustrates a case where the deterioration estimation system 100 further includes a display control unit 106. However, the deterioration estimation system 100 may not include the display control unit 106.

In the present example embodiment, the deterioration estimation system 100 is used for management of road surface deterioration using a road surface image. The road surface deterioration includes, for example, a crack, a pot hole, rutting, and flatness abnormality. Cracks may be classified into different types of straight cracks and tortoise-shell cracks depending on the shape. The straight crack is a single linear crack. The tortoise-shell crack is, for example, a tortoise-shell shaped crack generated when vertical and horizontal straight cracks are connected. Cracks develop from straight cracks to tortoise-shell cracks and pot holes.

Various indices are used as indices indicating the degree of road surface deterioration. In the present disclosure, the degree of road surface deterioration is represented by a degree of deterioration. The value representing the degree of deterioration can be set to be larger as the road surface deterioration progresses. The degree of deterioration may be any of indexes including a degree of cracking, the number of pot holes, a size of the pot hole, a rutting amount, or flatness.

The degree of cracking is represented by any of a shape, a length, a width, an area, and the number of cracks, or a combination thereof. The cracking rate is an example of the degree of cracking. The cracking rate is represented by, for example, 100×(crack area/road section area). In this case, the value of the degree of deterioration ranges from 0% to 100%. The crack area is calculated by any method. Note that a method of calculating the cracking rate is not particularly limited, and a known calculation method can be applied in addition to the above.

The size of the pot hole is represented by, for example, any of an area, a width, a length, and a depth of the pot hole, or a combination thereof. The rutting amount is a depth of rutting at which a traveling track of the vehicle is lower than other road surfaces due to a load of the vehicle and friction with tires.

The degree of deterioration may be determined based on a combination of a plurality of indexes indicating the degree of road surface deterioration. For example, the degree of deterioration may be a maintenance control index (MCI). The value of MCI is a minimum value of a result of calculating four definition equations using a cracking rate, a rutting amount, and flatness. The MCI decreases as the road deteriorates.

The road surface targeted by the deterioration estimation system 100 is not limited to a general road on which vehicles and people pass, and includes a test course of a vehicle, a runway, a guide path, and the like of an airport. That is, the deterioration estimation system 100 can widely target a paved road surface.

The detection unit 101 detects road surface deterioration from a road surface image obtained by imaging the road surface. The road surface image may include a portion other than the road surface, such as the sky, a road sign, or a building, as long as the road surface is imaged. Alternatively, the road surface image may be an image obtained by imaging only the road surface.

Figure 2:
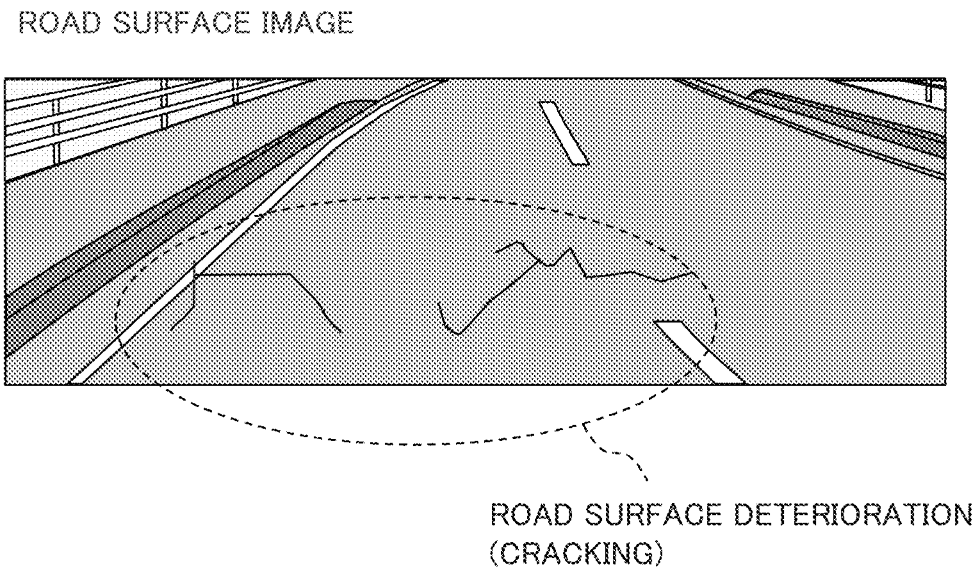
FIG. 2 is a diagram illustrating an example of a road surface image.

FIG. 2 is a diagram illustrating an example of a road surface image obtained by imaging a road on which a car runs. The road surface image of FIG. 2 includes a crack as an example of road surface deterioration.

The road surface image is captured by an in-vehicle camera such as a drive recorder. However, the type of the camera is not limited thereto, and various types of cameras may be used. For example, the road surface image may be captured by a camera mounted on another moving body such as a bicycle or a drone, a camera carried by a person, or a fixed camera installed on a road. The road surface image may be captured by a person or may be automatically captured.

Figure 3:
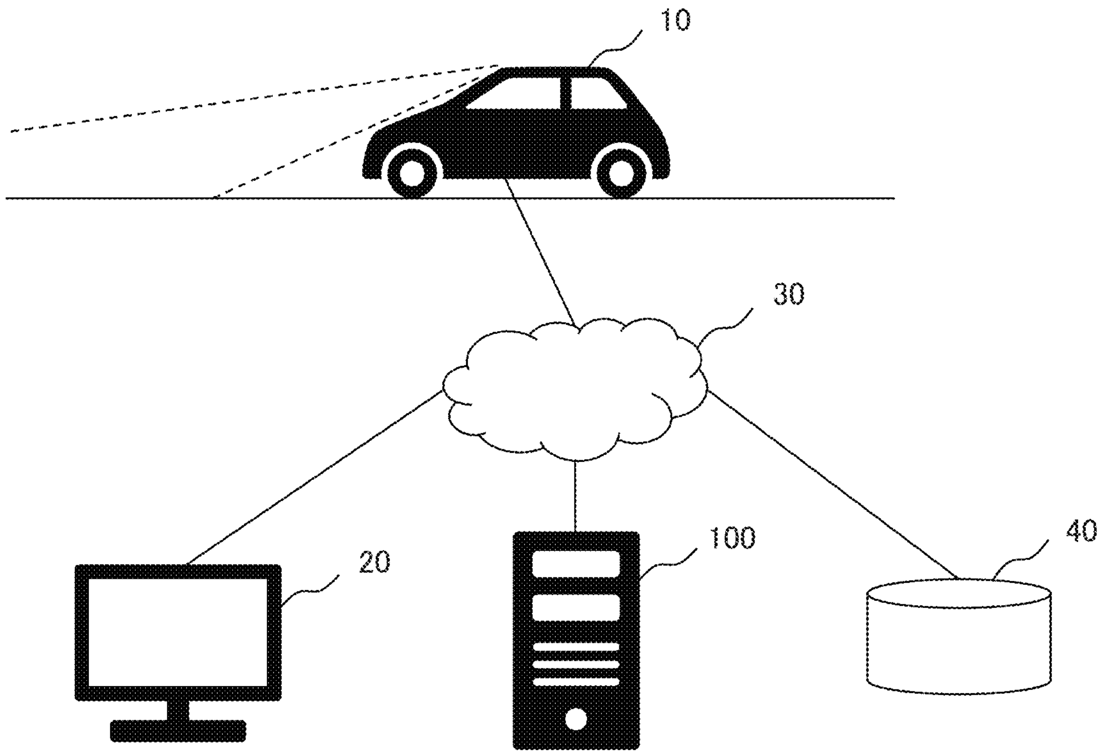
FIG. 3 is a diagram illustrating an example of a device communicably connected to the deterioration estimation system.

FIG. 3 is a diagram illustrating an example of a device communicably connected to the deterioration estimation system 100 in a wired or wireless manner via a communication network 30.

A display 20 is a display, a tablet, or the like connected to a computer. An input device such as a mouse or a keyboard may be connected to the display 20. In a case where the display 20 is a touch panel display, the display 20 may be configured as an input device. The display control unit 106 included in deterioration estimation system 100 displays various pieces of information on the display 20. Information displayed by the display control unit 106 will be described later.

The road surface image captured by the camera mounted on the vehicle 10 is transmitted to the deterioration estimation system 100. The transmitted road surface image may be stored in a database 40. At this time, the detection unit 101 may acquire the road surface image from database 40. Alternatively, when the deterioration estimation system 100 is communicably connected to an any camera, detection unit 101 may acquire the road surface image from the camera.

The detection unit 101 may acquire a road surface image and position information about a location where the road surface image is captured. The position information includes, for example, latitude and longitude, position information by a global navigation satellite system (GNSS) or a global positioning system (GPS), or a position on a map.

A method of acquiring the position is not particularly limited. A device that receives radio waves from a GNSS satellite may be provided in a moving body such as a camera or a car. For example, the detection unit 101 may acquire the position information about the newly captured road surface image by comparing the road surface image stored in the database in association with the position information with the newly captured road surface image.

Further, the detection unit 101 may acquire the road surface image and a date and time when the road surface image is captured.

For example, the detection unit 101 detects road surface deterioration using a known image recognition technique for the road surface image. The detection unit 101 may detect road surface deterioration using a machine-trained model. The detection unit 101 may determine whether the road surface is deteriorated for each pixel of the road surface image.

Figure 4:
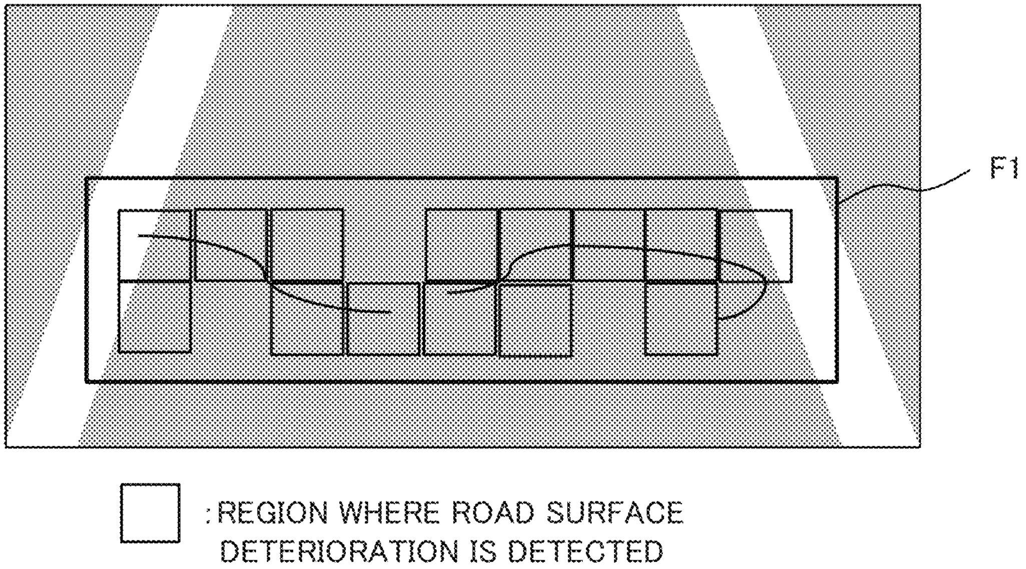
FIG. 4 is a diagram illustrating an example of a detection result of road surface deterioration.

FIG. 4 is a diagram illustrating an example of a detection result of road surface deterioration. For example, the detection unit 101 may detect road surface deterioration included in a detection region F1 in the road surface image. Detection region F1 is a region whose road surface deterioration is to be detected. For example, a region of the road surface in the road surface image is set as the detection region F1. When the road surface image includes only the road surface, the entire road surface image may be set as the detection region F1. For privacy protection, a region other than the road surface may be excluded from the detection region F1. Since it is difficult to detect road surface deterioration of a far road surface, a near road surface may be set as the detection region F1, and a far road surface may be excluded from the detection region F1. The range of the detection region F1 is an example, and the range is appropriately set.

It is assumed that the position of the detection region F1 in the road surface image captured by the drive recorder fixed to the vehicle is fixed. Therefore, for example, a predetermined position of the road surface image is set as the detection region F1.

Alternatively, the detection region F1 may be set by the user. The detection unit 101 may recognize the road surface, and set the region of the recognized road surface as the detection region F1.

For example, the detection unit 101 divides the road surface image in a predetermined unit. The detection unit 101 may detect the road surface deterioration for each of the divided units. The detection unit 101 may divide the detection region where the road surface deterioration is detected in the road surface image in a predetermined unit.

Determination unit 102 determines the first region and the second region in the road surface image. The first region is a region where road surface deterioration is detectable from the road surface image. The second region is a region where it is difficult to detect road surface deterioration from the road surface image. The road surface image in which the first region and the second region are determined is also referred to as a first road surface image.

Determination unit 102 may determine that there is no region related to the second region in the first road surface image.

The determination unit 102 may determine whether the region is the first region or the second region for each divided unit. For example, the determination unit 102 may determine the first region and the second region for each unit divided by the detection unit 101. Alternatively, regardless of whether the detection unit 101 divides the road surface image, separately from the detection unit 101, the determination unit 102 may divide the road surface image by a predetermined unit. The determination unit 102 may determine the first region and the second region in units different from the units divided by the detection unit 101.

Figure 5:
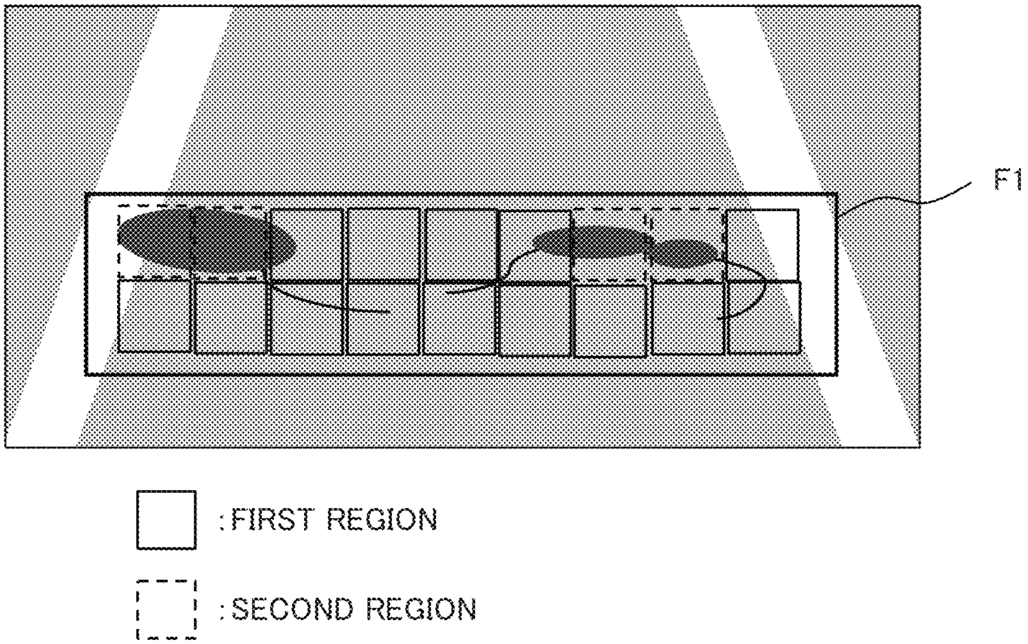
FIG. 5 is a view illustrating an example of the determined first region and second region.

FIG. 5 is a diagram illustrating an example of the determined first region and second region. In FIG. 5, the first region is indicated by a solid frame, and the second region is indicated by a dotted frame.

Hereinafter, a case where the determination unit 102 determines the first region and the second region based on the detection result by the detection unit 101 will be described. For example, the determination unit 102 determines a region where the road surface deterioration is detected by the detection unit 101 as the first region. Determination unit 102 may further determine, as the first region, a region determined by the detection unit 101 to have no road surface deterioration. For example, the exposed road surface can be determined as the first region.

Determination unit 102 may determine a region in which it is difficult to detect road surface deterioration among the regions in which the road surface deterioration is not detected as the second region. There is a possibility that road surface deterioration exists in a region where it is difficult to detect road surface deterioration. Determination unit 102 may determine the second region using a model machine trained on a region where it is difficult to detect road surface deterioration. A model for detecting road surface deterioration and a model for determining a region where it is difficult to detect road surface deterioration may be the same. That is, the detection of the road surface deterioration and the determination of the second region may be executed by the same processing.

For example, for a region with a puddle on the road surface, it is difficult to detect road surface deterioration under the puddle. Therefore, the determination unit 102 may recognize the puddle by the image recognition technique. Then, the determination unit 102 determines the region with the puddle as the second region.

The second region is not limited to a region having a puddle. The determination unit 102 may determine, as the second region, a region in which another shielding object that shields the road surface is recognized. For example, the second region may be a region covered with snow, a region covered with fallen leaves, a region hidden by other vehicles, and a region where dust falls. As in the puddle, the determination unit 102 may determine a region having a snow cover or fallen leaves as the second region.

The second region is not limited to a region with a shielding object. For example, even when there is no shielding object on the road surface, it may be difficult to detect road surface deterioration due to bad weather or sunset. A road surface with a shadow of a tree or a building is dark, and it may be difficult to detect road surface deterioration. Therefore, the determination unit 102 may determine the shaded region as the second region. At this time, the road surface that is irradiated with the light and on which the shielding object does not fall can be determined as the first region.

The determination unit 102 may set, as the second region, a region in which the road surface deterioration is detected from the road surface image that was captured before the road surface image among regions in which the road surface deterioration is not detected in the road surface image. A road surface image captured later is also referred to as a first road surface image, and a road surface image captured before the first road surface image is also referred to as a second road surface image. An image in which road surface deterioration is easily detected may be selected as the second road surface image. For example, an image that does not include a region where it is difficult to detect road surface deterioration may be selected as the second road surface image. An image captured on a sunny day may be selected as the second road surface image.

For example, the determination unit 102 refers to the database 40. Then, the determination unit 102 acquires the second road surface image captured at the same point as the first road surface image. Thereafter, the determination unit 102 compares the road surface deterioration detected from the first road surface image with the road surface deterioration detected in the second road surface image. Determination unit 102 determines, as the second region, a region in which the road surface deterioration was detected from the second road surface image among regions in which the road surface deterioration is not detected in the first road surface image.

The second road surface image may be selected by the user. For example, the determination unit 102 acquires a plurality of images in which the road surface deterioration is easily detected from database 40, and delivers the images to display control unit 106. Then, the display control unit 106 causes the user to display the plurality of acquired images. Determination unit 102 may acquire, as the second road surface image, an image selected by the user among the displayed images.

The case where determination unit 102 determines the first region and the second region based on the detection result by the detection unit 101 is described above. However, the determination unit 102 may determine the first region and the second region before the detection unit 101 detects the road surface deterioration. In this case, the determination unit 102 may determine the first region and the second region using a model machine trained on a region where road surface deterioration is detectable from the road surface image and a region where it is difficult to detect road surface deterioration from the road surface image. Alternatively, the determination unit 102 may compare the first road surface image with the second road surface image, determine a region having a matching degree equal to or higher than a predetermined threshold value as the first region, and determine a region having a matching degree lower than the threshold value as the second region using an existing image processing technique. The detection unit 101 then detects road surface deterioration of the region determined as the first region.

The first calculation unit 103 calculates the degree of deterioration of the first region based on the detection result from the first road surface image. For example, the first calculation unit 103 calculates the degree of deterioration for each region divided by the detection unit 101. As an example, in a case where the detection unit 101 detects a crack, the first calculation unit 103 calculates a cracking rate for each divided region. The first calculation unit 103 may calculate the degree of deterioration of the entire first region included in the first road surface image by merging the degrees of deterioration for respective regions. As an example of merging of the degrees of deterioration, the first calculation unit 103 may calculate an average of the degrees of deterioration of respective regions.

The estimation unit 104 estimates a degree of deterioration of the second region based on the past degree of deterioration. The past degree of deterioration is a degree of deterioration of road surface deterioration detected from a second road surface image obtained by imaging a road surface before the first road surface image. As the second road surface image, for example, the second road surface image used for determining the second region is used for estimating the degree of deterioration. However, the second road surface image used for estimating the degree of deterioration may be different from the image used for determining the second region.

For example, the estimation unit 104 estimates a degree of deterioration for each region divided by the detection unit 101. As an example, in a case where the detection unit 101 detects a crack, the estimation unit 104 estimates a cracking rate for each divided region. The estimation unit 104 may estimate the degree of deterioration of the entire second region included in the first road surface image by merging the degrees of deterioration of the respective regions. As an example of merging of the degrees of deterioration, the estimation unit 104 may calculate an average of the estimated degrees of deterioration of respective regions.

The estimation unit 104 may estimate the degree of deterioration acquired with respect to the second road surface image as the degree of deterioration of the second region of the first road surface image. Alternatively, the estimation unit 104 may estimate the degree of deterioration of the second region by correcting the acquired degree of deterioration with a parameter. A case where the estimation unit 104 corrects the degree of deterioration acquired with respect to the second road surface image will be described later.

For example, the estimation unit 104 acquires the past degree of deterioration from the database. The database stores past degrees of deterioration calculated for road surface deterioration detected from the road surface image. Further, the database stores the imaging point of the road surface image and the imaging date in association with the degree of deterioration. Then, the estimation unit 104 acquires the past degree of deterioration at the same point as the first road surface image from the database. When a plurality of degrees of deterioration is stored in the database, estimation unit 104 may refer to the degree of deterioration calculated from the latest second road surface image.

In order to acquire the past degree of deterioration, the estimation unit 104 may acquire the second road surface image. In this case, the past road surface image is stored in the database. For example, the estimation unit 104 may calculate the degree of deterioration from the second road surface image. However, in the above description, when the estimation unit 104 acquires the degree of deterioration from the database, the processing in which the estimation unit 104 calculates the degree of deterioration in the second road surface image can be reduced.

The estimation unit 104 may identify a region related to the second region of the first road surface image in the second road surface image. In this case, the estimation unit 104 acquires the degree of deterioration of the region identified from the second road surface image. However, the estimation unit 104 may not acquire the degree of deterioration of the region related to the second region of the first road surface image. The estimation unit 104 may acquire the degree of deterioration calculated from the whole of the second road surface image or the whole of the detection region of the second road surface image.

The estimation unit 104 may estimate the degree of deterioration acquired as described above with respect to the second road surface image as the degree of deterioration of the second region of the first road surface image.

Next, an example in which the estimation unit 104 corrects the degree of deterioration acquired with respect to the second road surface image using a parameter will be described. Each parameter affects how much the road surface deterioration of the first road surface image has progressed from the degree of deterioration at the imaging time point of the second road surface image.

For example, the estimation unit 104 estimates a degree of deterioration of the second region by adding the degree of deterioration acquired with respect to the second road surface image to a value obtained by weighting an any parameter. The estimation unit 104 may estimate the degree of deterioration of the second region by adding a plurality of values obtained by weighting the plurality of parameters to the degree of deterioration acquired with respect to the second road surface image. The weight assigned to each parameter represents the degree of influence of each parameter on the progress of road surface deterioration.

For the first region, the degree of deterioration detected from the first road surface image is used, and for the second region, a value obtained by correcting the degree of deterioration detected from the second road surface image with a parameter is used, so that the degree of deterioration of the road surface is estimated more accurately.

The type of the parameter is not particularly limited, and for example, the parameter may be at least one of a precipitation amount, presence or absence of a puddle, flatness, and a traffic volume. For example, the degree of deterioration of the second region is expressed by the following formula.

$$\text{Degree of deterioration of second region} = \text{degree of deterioration detected from second road surface image} + (\text{precipitation amount} \times W1 + \text{puddle} \times W2 + \text{flatness} \times W3 + \text{period} \times W4 + \ldots)$$

In the above formula, each of the precipitation amount, the puddle, the flatness, and the period represents a parameter. W1, W2, W3, and W4 represent weights of the respective parameters.

The estimation unit 104 may automatically acquire the value of the parameter. A case where the estimation unit 104 acquires the parameter having received the input from the user will be described later in the second example embodiment. Each parameter will be described below.

As an example of the parameter, the estimation unit 104 may estimate the degree of deterioration of the second region based on the total precipitation amount from the time when the second road surface image was imaged to the time when the first road surface image was imaged. The road surface deterioration is expected to progress as the total precipitation amount increases. Therefore, the larger the total precipitation amount is, the larger value the estimation unit 104 adds to the degree of deterioration acquired with respect to the second road surface image.

The estimation unit 104 refers to, for example, a database that stores the precipitation amount. The database may store data of the precipitation amount actually observed and the like. Alternatively, the stored precipitation amount may not be the precipitation amount actually observed, but may be an average precipitation amount for each predetermined period of a common year. For example, the estimation unit 104 refers to the monthly average precipitation amount.

Then, the estimation unit 104 acquires the total precipitation amount from the time when the second road surface image was imaged to the time when the first road surface image was imaged. The acquired precipitation amount may not be an accurate precipitation amount. The estimation unit 104 may acquire the total precipitation amount between the time points of the two road surface images were imaged, but the acquired precipitation amount is not limited thereto. For example, the estimation unit 104 may acquire the total precipitation amount including the precipitation amount several hours before and after the road surface image was imaged, or several days before and after the road surface image was imaged.

As an example of the parameter, the estimation unit 104 may estimate the degree of deterioration of the second region based on whether a puddle is imaged in the first road surface image. For example, the parameter in a case where there is a puddle may be set to "1", and the parameter in a case where there is no puddle may be set to "0". This parameter may be applied to the second region included in the road surface image in which the puddle is imaged regardless of whether there is a puddle in each second region. A road surface with a puddle may have poor drainage, and road surface deterioration is expected to likely to progress. Therefore, when there is a puddle on the road surface, the estimation unit 104 adds a predetermined value to the degree of deterioration acquired for the second road surface image with respect to the estimation of the degree of deterioration of the second region.

Alternatively, as an example of the parameter, the estimation unit 104 may estimate the degree of deterioration of the second region based on whether there is a puddle in the second region. For example, the parameter "1" is set to the second region with a puddle, and the parameter "0" is set to the second region without a puddle. A road surface with a puddle may be recessed relative to other road surfaces. Therefore, a flatness abnormality which is an example of road surface deterioration is expected to be present. The water accumulated on the recessed road surface is expected to advance the deterioration of the road surface. When there is a puddle in the second region, the estimation unit 104 adds a predetermined value to the degree of deterioration acquired with respect to the second road surface image.

As an example of the parameter, the estimation unit 104 may estimate the degree of deterioration of the second region based on the flatness of the road surface at the time of capturing the first road surface image. The flatness may be measured even if it is difficult to detect road surface deterioration from the road surface image. For example, the flatness can be measured by a method other than image recognition even when there is a puddle on a road surface on a rainy day.

The flatness may be represented by an International Roughness Index (IRI). The IRI is an index in which the road surface and the ride comfort of the driver are associated with each other, and represents the degree of unevenness as a numerical value. The IRI may be calculated based on measurement data obtained by measuring a road surface with a sensor. Alternatively, the IRI may be calculated based on a value of an acceleration sensor attached to the vehicle during traveling. Specifically, for example, the IRI is calculated based on the value of the acceleration in the vertical direction included in the acceleration acquired at the detection position. Note that the calculation method of the IRI is not limited to the above, and a known calculation method can be used.

For example, the estimation unit 104 acquires a value representing flatness from a vehicle that measures flatness while capturing the first road surface image. A road surface having low flatness and unevenness is expected to have a high degree of deterioration of road surface deterioration detected from the road surface image. Therefore, the lower the flatness is, the larger value the estimation unit 104 adds to the degree of deterioration acquired with respect to the second road surface image.

As an example of the parameter, the estimation unit 104 may estimate the degree of deterioration of the second region based on the length of the period from the time when the second road surface image was imaged to the time when the first road surface image was imaged. The longer the period, the more the road surface deterioration is expected to progress. The period may be represented by, for example, any of a year, a month, a day, or an hour. For example, the estimation unit 104 acquires the date and time when each of the first road surface image and the second road surface image was imaged, and calculates the length of the period. However, the length of the period used for estimation may not be an accurate value.

Alternatively, the estimation unit 104 may estimate the degree of deterioration of the second region based on the traffic volume as an example of the parameter. For example, the estimation unit 104 may estimate the degree of deterioration of the second region based on the total traffic volume from the time when the second road surface image was imaged to the time when the first road surface image was imaged. The road surface deterioration is expected to progress as the total traffic volume increases. The traffic volume represents, for example, the number of vehicles passing on a road surface.

The estimation unit 104 refers to, for example, a database that stores a traffic volume. The database may store annual traffic volume data, weekly traffic volume data, or the like. Alternatively, the stored traffic volume may not be the actually counted traffic volume, but may be an average traffic volume related to a point or a district where the road surface image is captured.

Then, the estimation unit 104 acquires the total traffic volume from the time when the second road surface image was imaged to the time when the first road surface image was imaged. The acquired traffic volume may not be an accurate traffic volume. The estimation unit 104 may acquire the total traffic volume between the two time points when the road surface image was imaged, but the acquired traffic volume is not limited thereto. For example, the estimation unit 104 may acquire the total traffic volume including the traffic volume several hours before and after the road surface image was imaged, or several days before and after the road surface image was imaged.

The larger the acquired total traffic volume is, the larger value the estimation unit 104 adds to the degree of deterioration acquired with respect to the second road surface image.

The values acquired for the above various parameters may be displayed by the display control unit 106. By displaying the value, the user can grasp what kind of parameter the degree of deterioration of the second region is estimated based on.

The estimation unit 104 may set the weight assigned to each parameter by an any method. For example, the weight may be set by a machine-trained model. Whether to use each parameter may also be set by the model.

In a district with a large traffic volume, a weight of a parameter related to the traffic volume may be set to be larger than other parameters. That is, the weight may be set in such a way that the degree of influence of the traffic volume on the road surface deterioration increases in a district with a large traffic volume. For example, the estimation unit 104 acquires a traffic volume in a predetermined period at a point where the road surface image was captured. Then, the estimation unit 104 changes the weight of the parameter that is the total traffic volume from the time when the second road surface image was imaged to the time when the first road surface image was imaged according to the acquired traffic volume. The estimation unit 104 changing the weight of the parameter according to the traffic volume is an example of estimating the degree of deterioration of the second region based on the traffic volume.

The estimation unit 104 may estimate the degree of deterioration of the second region based on the precipitation amount at the time when the first road surface image was imaged. For example, the estimation unit 104 may set the weight of the parameter related to the precipitation amount to be larger than other parameters in the rainy season and the snowfall season. That is, the weight may be set in such a way that the degree of influence of the precipitation amount on the road surface deterioration increases in a season with a large precipitation amount.

The estimation unit 104 may acquire the precipitation amount on the date when the first road surface image was imaged or the precipitation amount including the days before and after the imaging date. Alternatively, the estimation unit 104 may acquire precipitation in a period of an ordinary year around a day same as the date when the first road surface image was imaged. Based on the acquired precipitation amount, the estimation unit 104 weights a parameter that, for example, is the total precipitation amount from the time when the second road surface image was imaged to the time when the first road surface image was imaged.

As described above, by weighting the parameter, the degree of deterioration of the road surface can be estimated more accurately.

The second calculation unit 105 calculates the degree of deterioration of the imaged road surface based on the calculated degree of deterioration of the first region and the estimated degree of deterioration of the second region. The degree of deterioration calculated by the second calculation unit 105 is estimated to be the degree of deterioration of the road surface at the time of capturing the first road surface image.

For example, the second calculation unit 105 calculates the degree of deterioration of the imaged road surface by adding the degrees of deterioration of the first region and the second region by weighting the degrees of deterioration by the areas of the first region and the second region.

The degree of deterioration estimated by the second calculation unit 105 may be stored in the database as the data of the road surface of the first road surface image at the imaging time point. Since the estimated degree of deterioration is stored in the database, it is possible to refer to the estimated degree of deterioration together with data of another degree of deterioration at the same point at a later date. The detection result by the detection unit 101, the calculation result by the first calculation unit 103, and the estimation result by the estimation unit 104 may also be stored in the database in association with the degree of deterioration.

The display control unit 106 displays the degree of deterioration of the road surface calculated by the second calculation unit 105. The degree of deterioration may be displayed in different colors according to the range of the level of the degree of deterioration. For example, the high degree of deterioration may be displayed in red, the low degree of deterioration may be displayed in green, and the intermediate degree of deterioration may be displayed in yellow.

The display control unit 106 may further display the first road surface image. The display control unit 106 may display the first region and the second region on the road surface image in different modes. For example, the first region and the second region may be indicated by frames of different colors. Alternatively, the first region may be indicated by a solid frame, and the second region may be indicated by a dotted frame.

The display control unit 106 may indicate the detection region on the road surface image. For example, a frame indicating the detection region is displayed on the display by a frame having a color different from that of the first region and the second region or a thickness different from that of the first region and the second region. For privacy protection, the display control unit 106 may lower the resolution of a region other than the detection region to display the road surface image.

The display control unit 106 may reflect the calculated degree of deterioration on the map indicating the degree of deterioration of the road surface. For example, the road surface on the map is divided by a predetermined range. A color related to the range of the level of deterioration may be applied to each of the divided regions. In a case where an arrow indicating the traveling direction of the vehicle is displayed for each region of the road divided by a predetermined range, the arrow may be displayed in a color related to the range of the level of deterioration.

Figure 6:
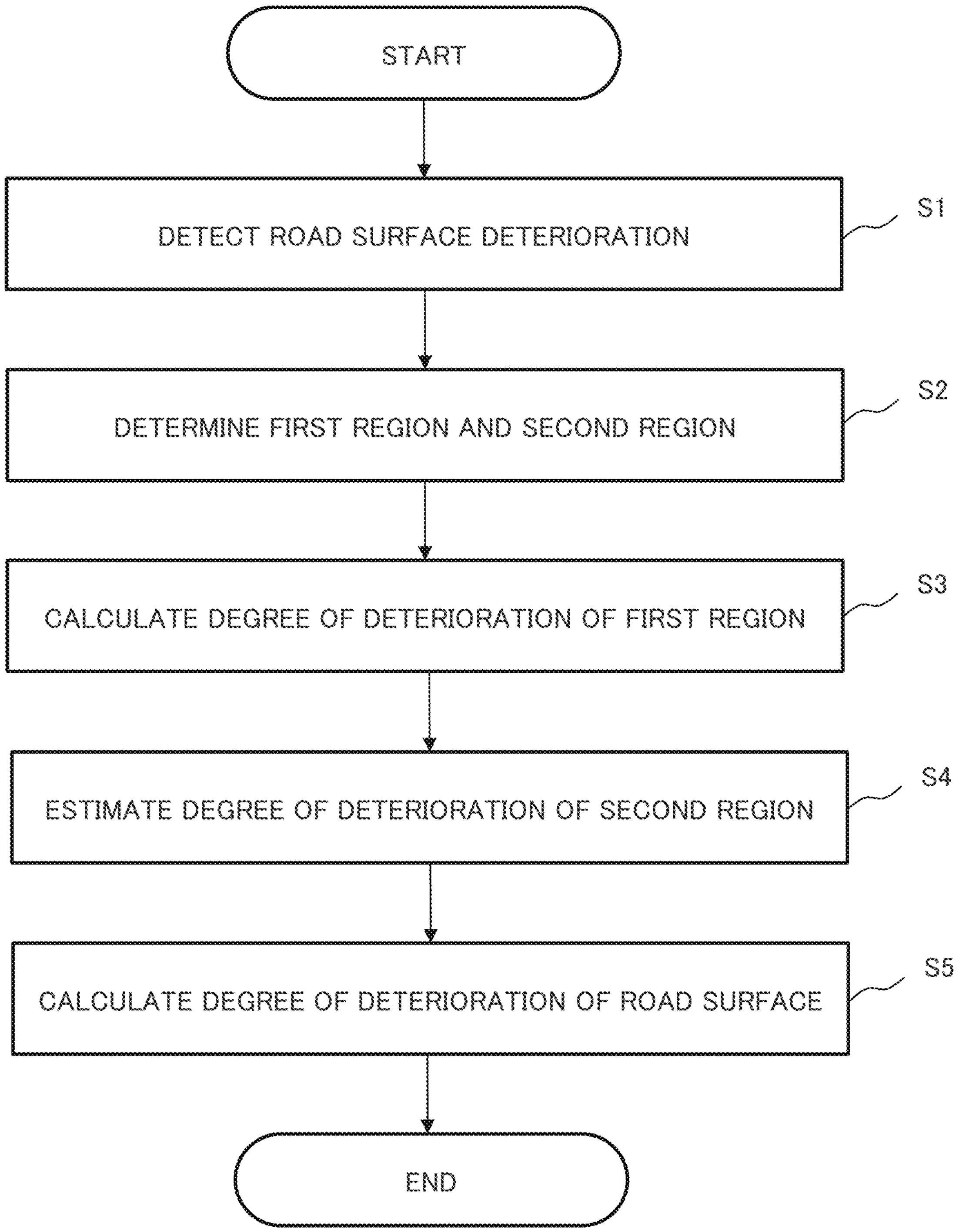
FIG. 6 is a flowchart illustrating an operation example of the deterioration estimation system.

FIG. 6 is a flowchart illustrating an operation example of the deterioration estimation system 100 according to the first example embodiment.

The detection unit 101 detects road surface deterioration from the first road surface image obtained by imaging the road surface (step S1). The detection unit 101 delivers the detected road surface deterioration to the first calculation unit 103. Next, the determination unit 102 determines, in the first road surface image, a first region in which road surface deterioration is detectable and a second region in which it is difficult to detect road surface deterioration (step S2). Step S2 may be performed before step S1.

The first calculation unit 103 calculates the degree of deterioration of the first region based on the detection result from the first road surface image (step S3). The first calculation unit 103 delivers the calculated degree of deterioration to the second calculation unit 105. The estimation unit 104 estimates a degree of deterioration of the second region based on the degree of deterioration of the road surface deterioration detected from the second road surface image obtained by imaging the road surface before the first road surface image (step S4). The estimation unit 104 delivers the estimated degree of deterioration to the second calculation unit 105.

The second calculation unit 105 calculates the degree of deterioration of the imaged road surface based on the calculated degree of deterioration of the first region and the estimated degree of deterioration of the second region (step S5). After step S5, the display control unit 106 may display the calculated degree of deterioration on the display.

As described above, in the first example embodiment, the deterioration estimation system 100 detects the degree of road surface deterioration from the road surface image. Then, the deterioration estimation system 100 calculates the degree of deterioration of the road surface based on the degree of deterioration calculated for the region where the road surface deterioration is detectable and the degree of deterioration estimated for the region where it is difficult to detect road surface deterioration. Therefore, even when there is a region where it is difficult to detect road surface deterioration in the road surface image obtained by imaging the road surface, the user can estimate the degree of deterioration of the road surface.

In the road surface image imaged on a rainy day or a snowy day, it is difficult to clearly image the state of the road surface, so that it is difficult to accurately measure deterioration. Therefore, when the road surface deterioration is measured using the image, the measurement may be stopped on a rainy day or a snowy day. When bad weather such as rain or snow continues, road surface deterioration cannot be measured for a long time. According to the first example embodiment, even when there is a region where it is difficult to detect road surface deterioration in an image captured on a rainy day or a snowy day, it is possible to measure the degree of deterioration.

Second Example Embodiment

Figure 7:
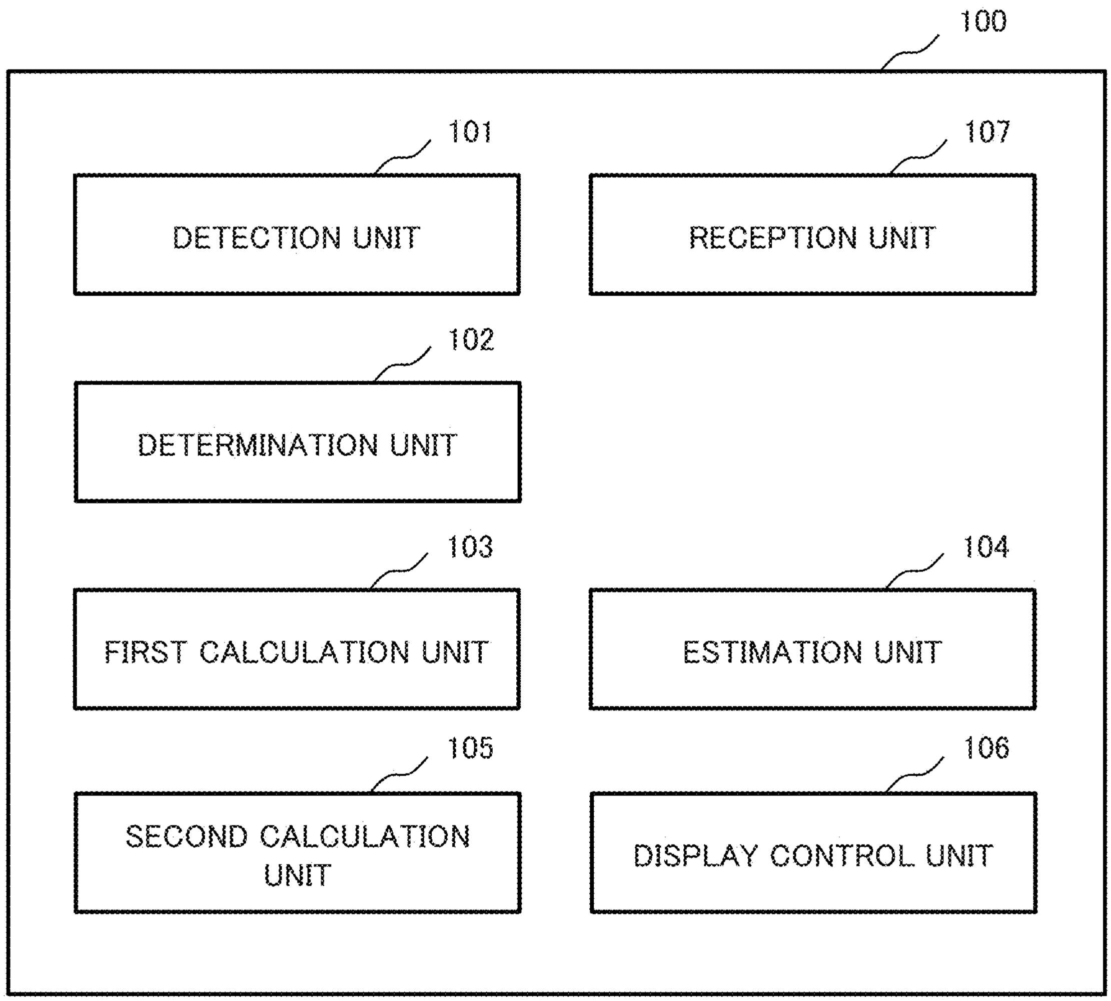
FIG. 7 is a block diagram illustrating another configuration example of the deterioration estimation system.

FIG. 7 is a diagram illustrating a configuration example of a deterioration estimation system 100 according to the second example embodiment. The deterioration estimation system 100 according to the second example embodiment is different from the deterioration estimation system 100 according to the first example embodiment in that a reception unit 107 is provided. Regarding the configuration of the second example embodiment, description of the configuration same as that of the first example embodiment will be partially omitted.

In the second example embodiment, the display control unit 106 displays the first road surface image. As in the first example embodiment, the first road surface image is an image in which detection of road surface deterioration and estimation of a degree of deterioration are performed.

The reception unit 107 receives the fact that the first road surface image includes a region where it is difficult to detect road surface deterioration. For example, the reception unit 107 receives, from the user, the fact that a region in which it is difficult to detect road surface deterioration is included. The reception unit 107 receives depression of a button by the user. The button is displayed on the display by the display control unit 106, for example.

Figure 8:
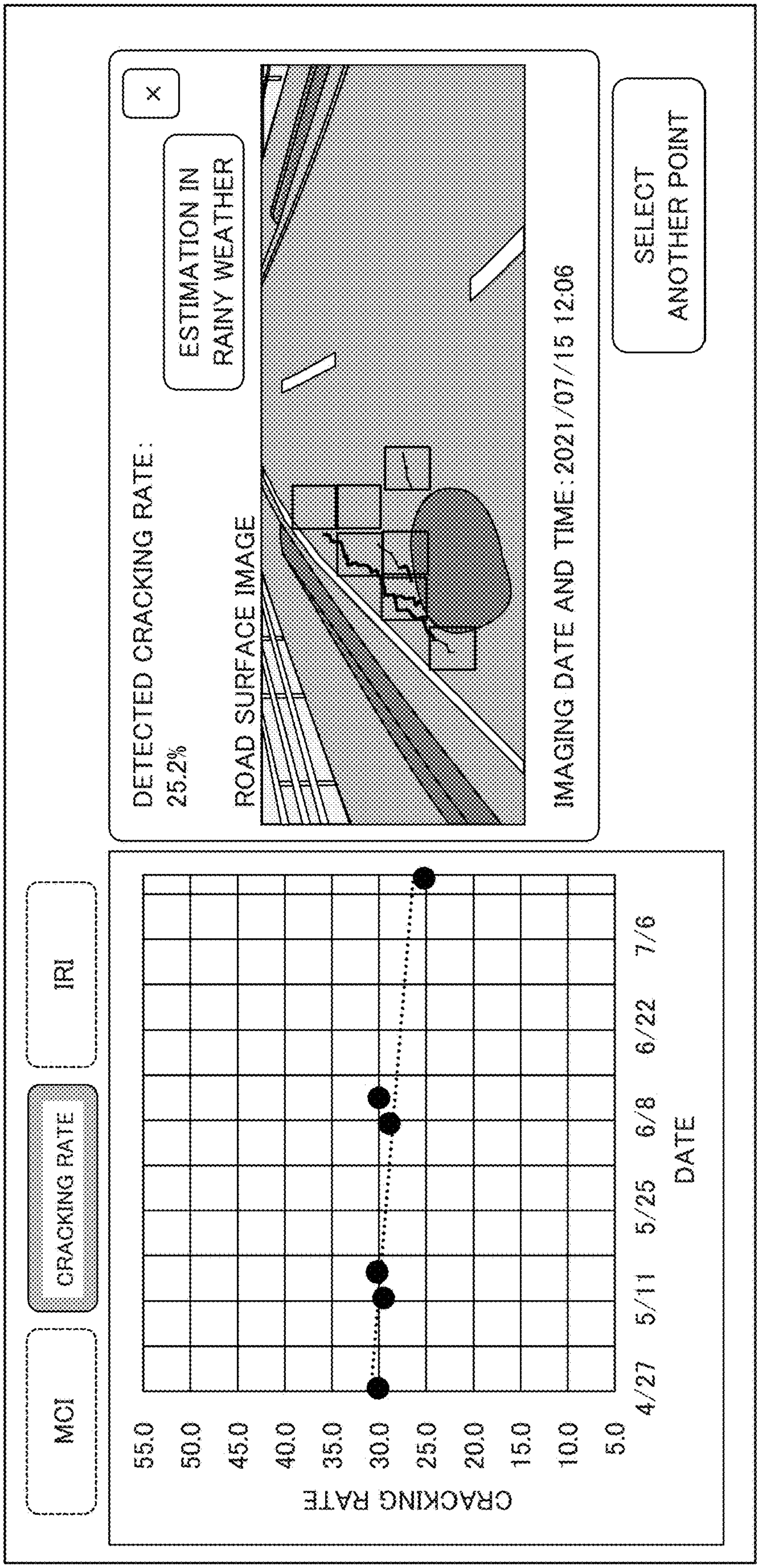
FIG. 8 is an image illustrating an example of a first screen.

FIG. 8 is an image illustrating an example of a first screen displayed on the display by the display control unit 106. The first screen includes a button for receiving the fact that a region where it is difficult to detect road surface deterioration is included. In FIG. 8, the first screen includes a first road surface image and a detection result of road surface deterioration by the detection unit 101.

The display control unit 106 may display the road surface deterioration detected from the first road surface image. For example, as illustrated in FIG. 8, the display control unit 106 superimposes and displays a frame surrounding the region where the road surface deterioration is detected on the road surface image. Alternatively, the display control unit 106 may display a road surface image in which the detected road surface deterioration is colored.

The display control unit 106 may display the degree of deterioration calculated for the road surface deterioration detected from the first road surface image. The degree of deterioration can be calculated by the first calculation unit 103. In FIG. 8, a cracking rate is displayed as an example of the degree of deterioration. Furthermore, the display control unit 106 may display the degree of deterioration measured in the past at the same point. In FIG. 8, the past degree of deterioration and the degree of deterioration measured from the first road surface image are plotted in a graph.

In FIG. 8, as an example of a button for receiving the fact that a region where it is difficult to detect road surface deterioration is included, an “estimation in rainy weather” button is displayed. However, the present example embodiment is not limited to use in rainy weather. The display mode of the button can be variously changed.

For example, the user confirms that a puddle is included in the displayed road surface image or that the road surface image is captured in rainy weather. Alternatively, the user may confirm that a region where road surface deterioration may exist is included in a region where road surface deterioration is not detected. In response to the confirmation, the user presses a button such as the "estimation in rainy weather" button.

The determination unit 102 determines the second region in response to reception by the reception unit 107, for example, as in the first example embodiment. Alternatively, the determination unit 102 may determine the region designated by the user as the second region. In this case, the reception unit 107 may receive designation of a region from the user and may receive an input to set the designated region as the second region.

When the second region is determined, the estimation unit 104 estimates a degree of deterioration of the second region as in the processing in the first example embodiment. Further, as in the processing in the first example embodiment, the second calculation unit 105 calculates the degree of deterioration of the road surface captured in the first road surface image based on the degree of deterioration of the first region and the degree of deterioration of the second region.

When the degree of deterioration is estimated based on the degree of deterioration acquired with respect to the second road surface image and a value obtained by weighting an any parameter, the reception unit 107 may further receive an input of the parameter by the user. At this time, the display control unit 106 displays a second screen that receives the input of the parameter.

Figure 9:
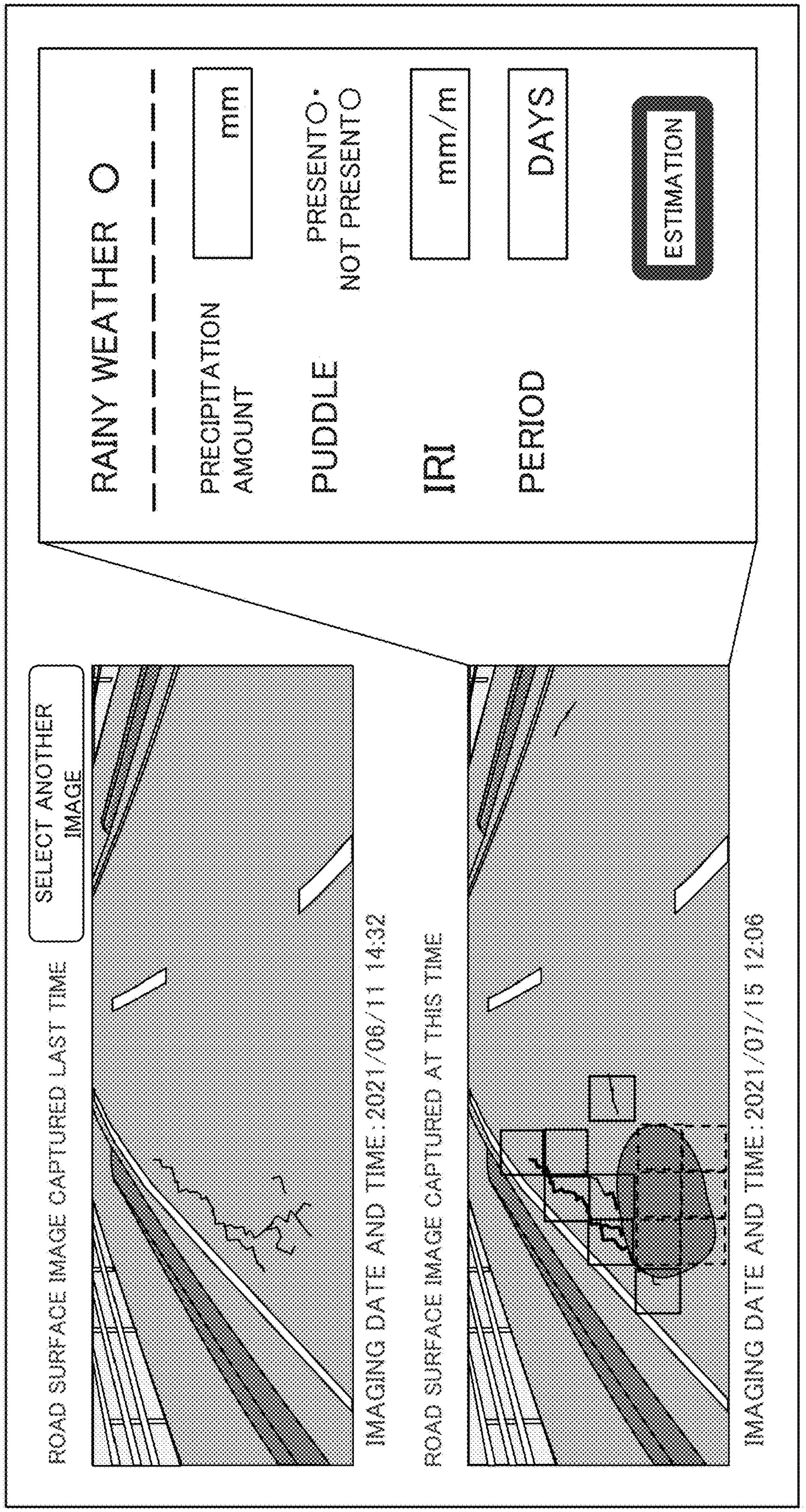
FIG. 9 is an image illustrating an example of a second screen.

FIG. 9 is an image illustrating an example of a second screen displayed on the display by the display control unit 106. In response to pressing of the "estimation in rainy weather" button on the first screen, the display control unit 106 may switch the first screen to the second screen and display the second screen.

The second screen of FIG. 9 includes fields for receiving input of parameters including the precipitation amount, the presence or absence of a puddle, flatness, and the length of a period. However, the parameters to be input are not limited thereto.

The precipitation amount may be, for example, the total precipitation amount from the time when the second road surface image was imaged to the time when the first road surface image was imaged. The presence or absence of the puddle may be whether the puddle is imaged in the first road surface image. The flatness may be an IRI calculated based on a value of an acceleration sensor mounted on the vehicle while traveling. The length of the period is, for example, a length of a period from the time when the second road surface image was imaged to the time when the first road surface image was imaged.

The second screen may include, for example, a radio button pressed in a case where the image is captured in rainy weather. In response to input to the radio button, input to a field below the button may be enabled.

Some or all of the parameters may be automatically input. For example, the display control unit 106 displays the parameters acquired by the estimation unit 104. The automatically input parameter may be corrected by the user via the reception unit 107.

As illustrated in FIG. 9, the first road surface image may be displayed as the "image captured this time" on the second screen. The first region and the second region determined by the determination unit 102 may be indicated on the first road surface image. As the second road surface image, the "previously captured road surface image" may be displayed on the second screen.

The display of the second screen may be omitted. For example, in a case where a value obtained by weighting various parameters is not added to estimate the degree of deterioration, the display of the second screen may be omitted.

After the second calculation unit 105 calculates the degree of deterioration, the display control unit 106 displays the third screen. The third screen displays the calculation result of the degree of deterioration at the time point when the first road surface image was imaged by the second calculation unit 105.

Figure 10:
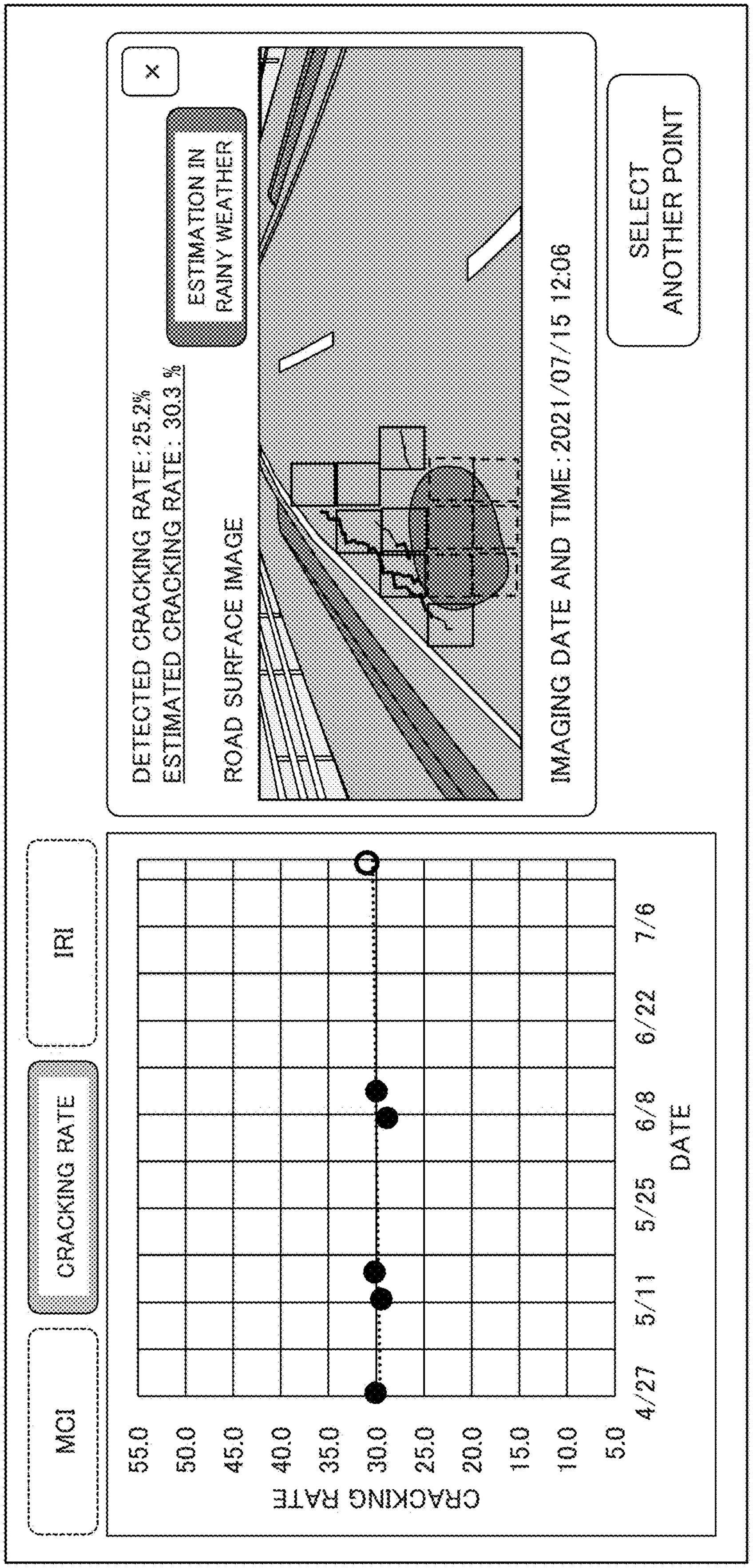
FIG. 10 is an image illustrating an example of a third screen.

FIG. 10 is an image illustrating an example of the third screen displayed on the display by the display control unit 106. In response to pressing of the "estimation" button on the second screen, the display control unit 106 may switch the second screen to the third screen and display the third screen. Alternatively, in a case where the display of the second screen is omitted, the display control unit 106 may switch the first screen to the third screen and display the third screen in response to pressing of a button such as the "estimation in rainy weather" button on the first screen.

The third screen displays the degree of deterioration calculated by the second calculation unit 105. As an example of the degree of deterioration calculated by the second calculation unit 105, the "estimated cracking rate" is displayed in FIG. 10. In FIG. 10, the degree of deterioration calculated by the second calculation unit is plotted on a graph. The degree of deterioration measured from the first road surface image and the estimated degree of deterioration may be displayed in different modes.

Figure 11:
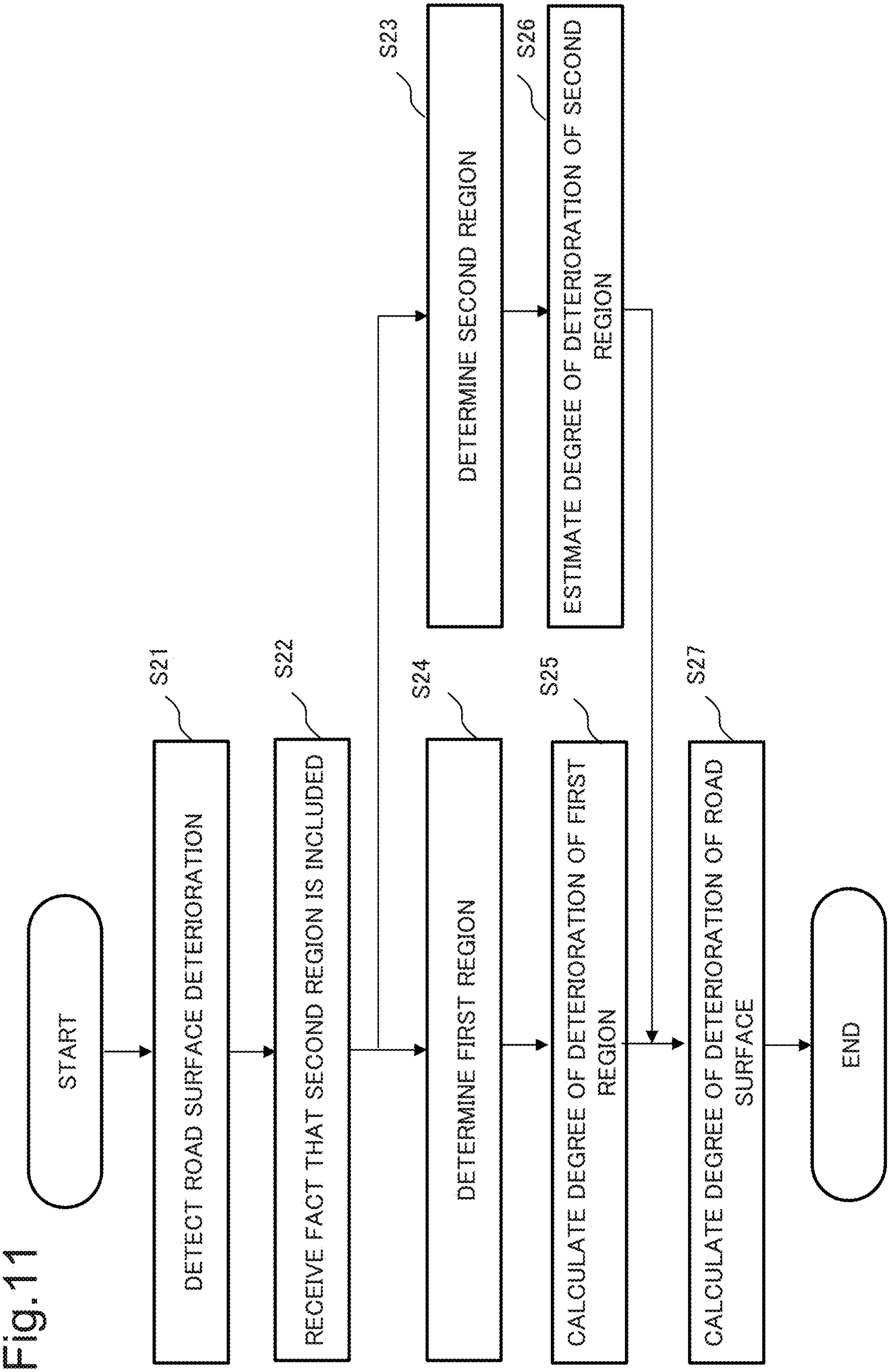
FIG. 11 is a flowchart illustrating another operation example of the deterioration estimation system.

FIG. 11 is a flowchart illustrating an operation example of the deterioration estimation system 100 according to the second example embodiment.

The detection unit 101 detects road surface deterioration from the first road surface image obtained by imaging the road surface (step S21). The detection unit 101 delivers the detected road surface deterioration to the first calculation unit 103 and the display control unit 106. After step S21, the display control unit 106 may display the detected road surface deterioration. For example, the display control unit 106 displays the first screen in FIG. 8.

Next, the reception unit 107 receives the fact that the first road surface image includes a region where it is difficult to detect road surface deterioration (step S22). For example, the reception unit 107 receives, from the user, the pressing of the "estimation in rainy weather" button in FIG. 8.

The determination unit 102 determines the second region in which it is difficult to detect road surface deterioration in the first road surface image according to the reception by reception unit 107 (step S23). The determination unit 102 delivers the determined second region to the estimation unit 104.

The determination unit 102 further determines a first region in which road surface deterioration is detectable (step S24). The determination unit 102 delivers the determined first region to the first calculation unit 103. The determination of the first region may be executed by the same processing as the determination of the second region in step S23. Alternatively, the determination of the first region may be executed at any timing between before step S21 and before step S25.

The first calculation unit 103 calculates the degree of deterioration of the first region based on the detection result from the first road surface image (step S25). The first calculation unit 103 delivers the calculated degree of deterioration to the second calculation unit 105. Step S25 may be executed at any timing after the road surface deterioration is detected and the first region is determined.

The estimation unit 104 estimates a degree of deterioration of the second region based on the past degree of deterioration (step S26). The past degree of deterioration is a degree of deterioration of road surface deterioration detected from a second road surface image obtained by imaging a road surface before the first road surface image. For example, in step S26, the estimation unit 104 acquires the degree of deterioration related to the second road surface image from the database. The estimation unit 104 delivers the estimated degree of deterioration to the second calculation unit 105.

The second calculation unit 105 calculates the degree of deterioration of the imaged road surface based on the calculated degree of deterioration of the first region and the estimated degree of deterioration of the second region (step S27). After step S27, the display control unit 106 may display the calculated degree of deterioration on the display.

As described above, in the second example embodiment, the deterioration estimation system 100 determines the second region according to the reception that the first road surface image includes the region in which it is difficult to detect road surface deterioration, and estimates a degree of deterioration of the second region. Therefore, the second region can be determined only when necessary. Even when there is a region in which it is difficult to detect road surface deterioration in the road surface image obtained by imaging the road surface, the degree of deterioration of the road surface can be estimated.

Modifications

Modifications according to the second example embodiment will be described. The deterioration estimation system 100 according to the second example embodiment may further include an assessment unit. The assessment unit assesses whether there is a possibility that a region in which it is difficult to detect road surface deterioration is included, based on weather information at the time when the first road surface image was captured. The assessment unit acquires weather information of a point or a district where the road surface image is captured.

The weather information is, for example, information about weather, a precipitation amount, or a snow accumulation amount. The information about the weather indicates any of various weather such as sunny, cloudy, rainy, snowy, and foggy, for example. The weather information may include a wind speed, a sunrise time, a sunset time, and the like.

For example, the assessment unit acquires the date when the road surface image was imaged or the weather information at the imaging time point. Alternatively, the assessment unit may acquire weather information within a predetermined range before and after the day on which the road surface image is captured. When the weather information is rain, a puddle may occur on the road surface. Therefore, the assessment unit assesses that there is a possibility that a region in which it is difficult to detect road surface deterioration is included.

The determination method is not limited to the above, and various changes can be made. For example, when the wind speed is high, there is a possibility that the leaves fall on the road surface. Therefore, the assessment unit may assess that the road surface image captured on the day when the wind speed is high or the day after the day when the wind speed is high may include a region where it is difficult to detect road surface deterioration. The assessment unit may assess that there is a possibility that a road surface image captured within a predetermined range before and after sunset time includes a region where it is difficult to detect road surface deterioration due to a shadow.

The reception unit 107 receives from the assessment unit the fact that the region in which it is difficult to detect road surface deterioration is included.

As described in the second example embodiment, the determination unit 102 determines the second region in response to reception by the reception unit 107. That is, the determination unit 102 may determine the second region according to the determination that there is a possibility that a region in which it is difficult to detect road surface deterioration is included based on the weather information at the time when the first road surface image was captured.

[Hardware Configuration]

In each of the above-described example embodiments, each component of the deterioration estimation system 100 indicates a block of a functional unit. Some or all of the components of the deterioration estimation system 100 may be achieved by an any combination of the computer 500 and the program.

Figure 12:
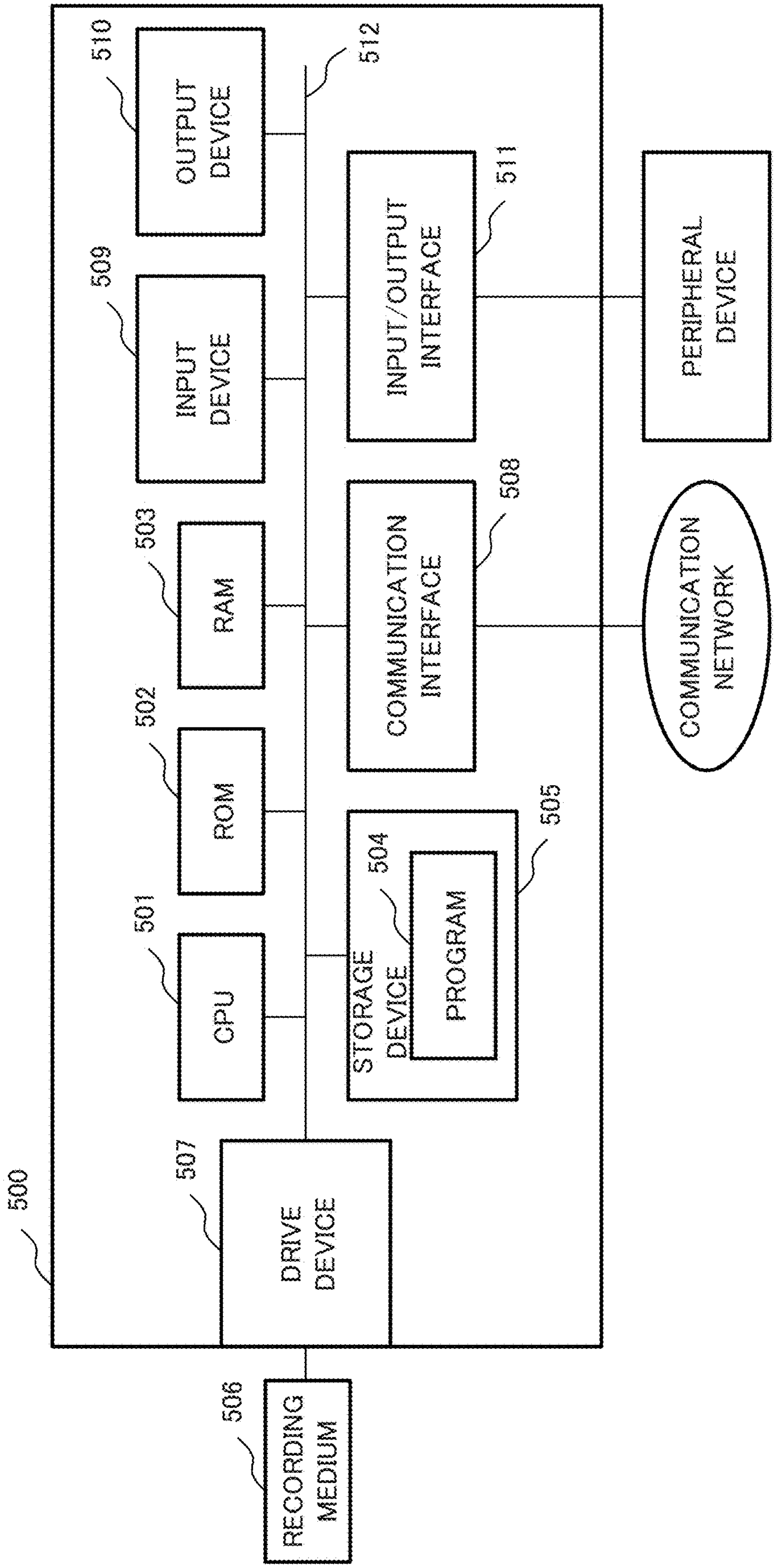
FIG. 12 is a block diagram illustrating an example of a hardware configuration of a computer.

FIG. 12 is a block diagram illustrating an example of a hardware configuration of the computer 500. Referring to FIG. 12, the computer 500 includes, for example, a central processing unit (CPU) 501, a read only memory (ROM) 502, a random access memory (RAM) 503, a program 504, a storage device 505, a drive device 507, a communication interface 508, an input device 509, an input/output interface 511, and a bus 512.

The program 504 includes an instruction for implementing each function of the deterioration estimation system 100. The program 504 is stored in advance in the ROM 502, the RAM 503, and the storage device 505. The CPU 501 achieves each function of the deterioration estimation system 100 by executing a command included in the program 504. For example, the CPU 501 of the deterioration estimation system 100 executes a command included in the program 504 to implement the function of the deterioration estimation system 100. The RAM 503 may store data processed by each function of the deterioration estimation system 100. For example, the road surface image may be stored in the RAM 503 of the computer 500.

The drive device 507 reads and writes the recording medium 506. The communication interface 508 provides an interface with a communication network. The input device 509 is, for example, a mouse, a keyboard, or the like, and receives an input of information from the user. The output device 510 is, for example, a display, to output (displays) information to the user. The input/output interface 511 provides an interface with a peripheral device. The bus 512 connects the components of the hardware. The program 504 may be supplied to the CPU 501 via a communication network, or may be stored in the recording medium 506 in advance, read by the drive device 507, and supplied to the CPU 501.

The hardware configuration illustrated in FIG. 12 is an example, and other components may be added or some components may not be included.

There are various modifications of the method of implementing the deterioration estimation system 100. For example, the deterioration estimation system 100 may be achieved by an any combination of a computer and a program different for each component. A plurality of components included in the deterioration estimation system 100 may be achieved by an any combination of one computer and a program.

Some or all of the components of the deterioration estimation system 100 may be achieved by one or a plurality of processors. The processor may be configured by a single chip or may be configured by a plurality of chips connected via a bus. Some or all of the components of the deterioration estimation system 100 may be achieved by a combination of the processor and the program described above.

In a case where some or all of the components of the deterioration estimation system 100 are achieved by a plurality of computers, circuits, and the like, the plurality of computers, circuits, and the like may be disposed in a centralized manner or in a distributed manner.

At least part of the deterioration estimation system 100 may be provided in a software as a service (Saas) format. That is, at least part of the functions for implementing the deterioration estimation system 100 may be executed by software executed via a network.

While the present disclosure has been particularly shown and described with reference to exemplary example embodiments thereof, the present disclosure is not limited to these example embodiments. It will be understood by those of ordinary skill in the art that various changes in form and details of the present disclosure may be made therein without departing from the spirit and scope of the present disclosure as defined by the claims. The configurations in the respective example embodiments can be combined with each other without departing from the scope of the present disclosure.

Some or all of the above example embodiments may be described as the following Supplementary Notes, but are not limited to the following.

Supplementary Note 1

A deterioration estimation system including a detection means for detecting road surface deterioration from a first road surface image obtained by imaging a road surface, a determination means for determining, in the first road surface image, a first region in which road surface deterioration is detectable and a second region in which it is difficult to detect road surface deterioration, a first calculation means for calculating a degree of deterioration of the first region based on a detection result from the first road surface image, an estimation means for estimating a degree of deterioration of the second region based on a degree of deterioration in road surface deterioration detected from a second road surface image obtained by imaging the road surface before the first road surface image, and a second calculation means for calculating a degree of deterioration of the road surface based on the calculated degree of deterioration of the first region and the estimated degree of deterioration of the second region.

Supplementary Note 2

The deterioration estimation system according to Supplementary Note 1, wherein the determination means determines, as the second region, a region having at least one of a puddle, a snow cover, a fallen leaf, or a shadow in the first road surface image.

Supplementary Note 3

The deterioration estimation system according to Supplementary Note 1 or 2, wherein the estimation means estimates a degree of deterioration of the second region by correcting a degree of deterioration detected from the second road surface image using a parameter.

Supplementary Note 4

The deterioration estimation system according to Supplementary Note 3, wherein the estimation means estimates a degree of deterioration of the second region using, as the parameter, a total precipitation amount from a time when the second road surface image was imaged to a time when the first road surface image was imaged.

Supplementary Note 5

The deterioration estimation system according to Supplementary Note 4, wherein the estimation means estimates a degree of deterioration of the second region further using, as the parameter, whether a puddle is imaged in the first road surface image.

Supplementary Note 6

The deterioration estimation system according to Supplementary Note 4 or 5, wherein the estimation means estimates a degree of deterioration of the second region further using, as the parameter, whether there is a puddle in the second region.

Supplementary Note 7

The deterioration estimation system according to any one of Supplementary Notes 4 to 6, wherein the estimation means estimates a degree of deterioration of the second region further using, as the parameter, flatness of the road surface at a time point when the first road surface image is imaged.

Supplementary Note 8

The deterioration estimation system according to any one of Supplementary Notes 4 to 7, wherein the estimation means estimates a degree of deterioration of the second region further using, as the parameter, a length of a period from a time when the second road surface image was imaged to a time when the first road surface image was imaged.

Supplementary Note 9

The deterioration estimation system according to any one of Supplementary Notes 4 to 8, wherein the estimation means estimates a degree of deterioration of the second region further using, as the parameter, a total traffic volume from a time when the second road surface image was imaged to a time when the first road surface image was imaged.

Supplementary Note 10

The deterioration estimation system according to Supplementary Note 9, wherein the estimation means estimates a degree of deterioration of the second region by changing a weight of the total traffic volume among a plurality of the parameters according to a traffic volume of a district including the road surface.

Supplementary Note 11

The deterioration estimation system according to any one of Supplementary Notes 4 to 10, wherein the estimation means estimates a degree of deterioration of the second region by changing a weight of the total precipitation amount among a plurality of the parameters according to a precipitation amount at a time when the first road surface image was imaged.

Supplementary Note 12

The deterioration estimation system according to any one of Supplementary Notes 3 to 10, wherein the estimation means estimates a degree of deterioration of the second region based on the parameter input by a user.

Supplementary Note 13

The deterioration estimation system according to Supplementary Note 1 or 2, wherein the estimation means estimates a degree of deterioration of road surface deterioration detected from the second road surface image as a degree of deterioration of the second region.

Supplementary Note 14

The deterioration estimation system according to any one of Supplementary Notes 1 to 13, further including a reception means for receiving a fact that the first road surface image includes a region in which it is difficult to detect road surface deterioration, wherein the determination means determines the second region according to the reception.

Supplementary Note 15

The deterioration estimation system according to any one of Supplementary Notes 1 to 14, wherein the determination means determines the second region in accordance with a determination, based on weather information at a time when the first road surface image was imaged, that there is a possibility that a region in which it is difficult to detect road surface deterioration is included.

Supplementary Note 16

A deterioration estimation method including detecting road surface deterioration from a first road surface image obtained by imaging a road surface, determining, in the first road surface image, a first region in which road surface deterioration is detectable and a second region in which it is difficult to detect road surface deterioration, calculating a degree of deterioration of the first region based on a detection result from the first road surface image, estimating a degree of deterioration of the second region based on a degree of deterioration in road surface deterioration detected from a second road surface image obtained by imaging the road surface before the first road surface image, and calculating a degree of deterioration of the road surface based on the calculated degree of deterioration of the first region and the estimated degree of deterioration of the second region.

Supplementary Note 17

A recording medium that non-transiently records a program for causing a computer to execute the steps of detecting road surface deterioration from a first road surface image obtained by imaging a road surface, determining, in the first road surface image, a first region in which road surface deterioration is detectable and a second region in which it is difficult to detect road surface deterioration, calculating a degree of deterioration of the first region based on a detection result from the first road surface image, estimating a degree of deterioration of the second region based on a degree of deterioration in road surface deterioration detected from a second road surface image obtained by imaging the road surface before the first road surface image, and calculating a degree of deterioration of the road surface based on the calculated degree of deterioration of the first region and the estimated degree of deterioration of the second region.

REFERENCE SIGNS LIST

100 deterioration estimation system
101 detection unit
102 determination unit
103 first calculation unit
104 estimation unit
105 second calculation unit
106 display control unit
107 reception unit
10 vehicle
20 display
30 communication network
40 database

What is claimed is:

1. A deterioration estimation system comprising:

at least one memory configured to store instructions; and at least one processor configured to execute the instructions to:

detect road surface deterioration from a first road surface image obtained by imaging a road surface;

categorize, in the first road surface image, a first region in which road surface deterioration is detectable and a second region in which road surface deterioration is difficult to detect;

calculate a degree of deterioration of the first region based on a detection result from the first road surface image;

estimate a degree of deterioration of the second region based on a degree of deterioration in road surface deterioration detected from a second road surface image obtained by imaging the road surface before the first road surface image, wherein the second road surface image was captured at the same location as the first road surface image under conditions where road surface deterioration was detectable; and calculate a degree of deterioration of the road surface by integrating the degree of deterioration of the first region derived from the first road surface image with the degree of deterioration of the second region derived from the second road surface image, wherein the integrated degree of deterioration represents deterioration of an entire road surface at a time when the first road surface image was captured.

2. The deterioration estimation system according to claim 1, wherein the at least one processor is further configured to execute the instructions to:

determine, as the second region, a region having at least one of a puddle, a snow cover, a fallen leaf, or a shadow in the first road surface image.

3. The deterioration estimation system according to claim 1, wherein the at least one processor is further configured to execute the instructions to:

estimate a degree of deterioration of the second region by correcting a degree of deterioration detected from the second road surface image using a physical parameter, wherein the estimation accounts for temporal progression of deterioration from the past to the current time.

4. The deterioration estimation system according to claim 3, wherein the at least one processor is further configured to execute the instructions to:

estimate a degree of deterioration of the second region using, as the parameter, a total precipitation amount from a time when the second road surface image was imaged to a time when the first road surface image was imaged.

5. The deterioration estimation system according to claim 4, wherein the at least one processor is further configured to execute the instructions to:

estimate a degree of deterioration of the second region further using, as the parameter, whether a puddle is imaged in the first road surface image.

6. The deterioration estimation system according to claim 4, wherein the at least one processor is further configured to execute the instructions to:

estimate a degree of deterioration of the second region further using, as the parameter, whether there is a puddle in the second region.

7. The deterioration estimation system according to claim 4, wherein the at least one processor is further configured to execute the instructions to:

estimate a degree of deterioration of the second region further using, as the parameter, flatness of the road surface at a time point when the first road surface image is imaged.

8. The deterioration estimation system according to claim 4, wherein the at least one processor is further configured to execute the instructions to:

estimate a degree of deterioration of the second region further using, as the parameter, a length of a period from a time when the second road surface image was imaged to a time when the first road surface image was imaged.

9. The deterioration estimation system according to claim 4, wherein the at least one processor is further configured to execute the instructions to:

estimate a degree of deterioration of the second region further using, as the parameter, a total traffic volume from a time when the second road surface image was imaged to a time when the first road surface image was imaged.

10. The deterioration estimation system according to claim 9, wherein the at least one processor is further configured to execute the instructions to:

change a weight of the total traffic volume among a plurality of the parameters according to a traffic volume of a district including the road surface in a predetermined period.

11. The deterioration estimation system according to claim 4, wherein the at least one processor is further configured to execute the instructions to:

change a weight of the total precipitation amount among a plurality of the parameters according to a precipitation amount at a time when the first road surface image was imaged.

12. The deterioration estimation system according to claim 3, wherein the parameter is input by a user.

13. The deterioration estimation system according to claim 1, wherein the at least one processor is further configured to execute the instructions to:

estimate a degree of deterioration of road surface deterioration detected from the second road surface image as a degree of deterioration of the second region.

14. The deterioration estimation system according to claim 1, wherein the at least one processor is further configured to execute the instructions to:

receive, from a user, a designation that the first road surface image includes a region in which it is difficult to detect road surface deterioration; and determine the second region according to the received designation.

15. The deterioration estimation system according to claim 1, wherein the at least one processor is further configured to execute the instructions to:

determine the second region in accordance with a determination, based on weather information at a time when the first road surface image was imaged, that there is a possibility that a region in which it is difficult to detect road surface deterioration is included.

16. A deterioration estimation method comprising:

detecting road surface deterioration from a first road surface image obtained by imaging a road surface;

determining, in the first road surface image, a first region in which road surface deterioration is detectable and a second region in which road surface deterioration is difficult to detect;

calculating a degree of deterioration of the first region based on a detection result from the first road surface image;

estimating a degree of deterioration of the second region based on a degree of deterioration in road surface deterioration detected from a second road surface image obtained by imaging the road surface before the first road surface image, wherein the second road surface image was captured at the same location as the first road surface image under conditions where road surface deterioration was detectable; and calculating a degree of deterioration of the road surface by integrating the degree of deterioration of the first region derived from the first road surface image with the degree of deterioration of the second region derived from the second road surface image, wherein the integrated degree of deterioration represents deterioration of an entire road surface at a time when the first road surface image was captured.

17. A recording medium that non-transiently records a program for causing a computer to execute the steps of:

detecting road surface deterioration from a first road surface image obtained by imaging a road surface;

determining, in the first road surface image, a first region in which road surface deterioration is detectable and a second region in which road surface deterioration is difficult to detect;

calculating a degree of deterioration of the first region based on a detection result from the first road surface image;

estimating a degree of deterioration of the second region based on a degree of deterioration in road surface deterioration detected from a second road surface image obtained by imaging the road surface before the first road surface image, wherein the second road surface image was captured at the same location as the first road surface image under conditions where road surface deterioration was detectable; and calculating a degree of deterioration of the road surface by integrating the degree of deterioration of the first region derived from the first road surface image with the degree of deterioration of the second region derived from the second road surface image, wherein the integrated degree of deterioration represents deterioration of an entire road surface at a time when the first road surface image was captured.

* * * * *